Jan. 5, 1932. H. KLOCKSIEM 1,839,790
HARVESTER REEL END GUARD DEVICE
Filed Aug. 25, 1930
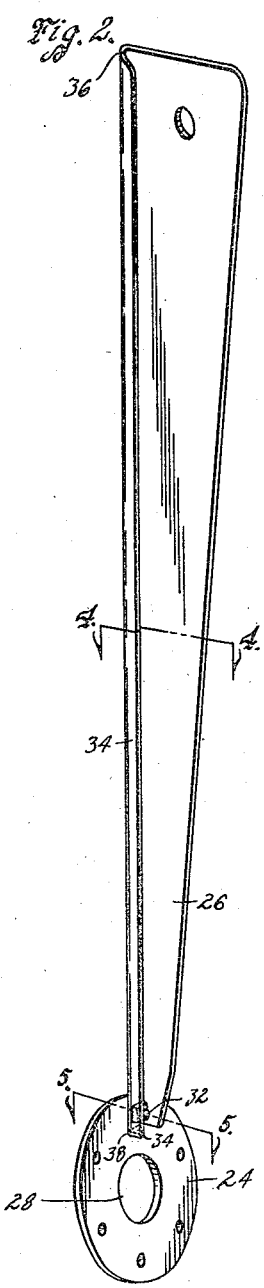
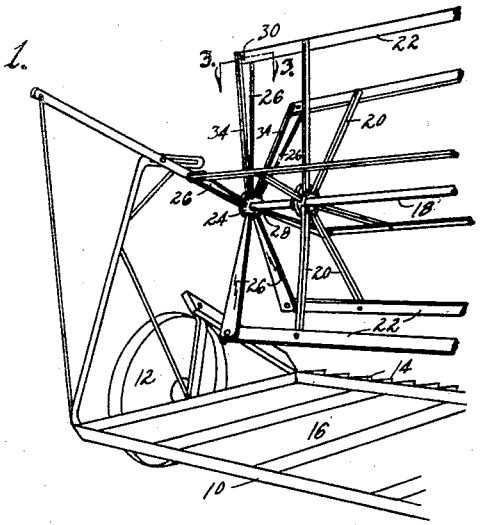
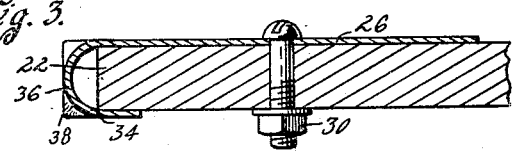
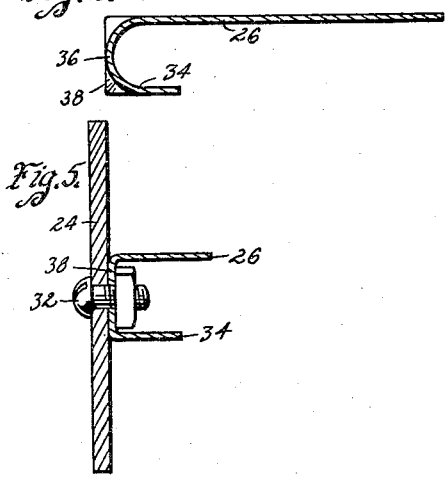
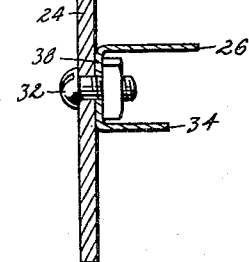
Inventor
Henry Klocksiem
by Bair, Freeman & Sinclair
Attorneys
Witness
H. S. Mungenmaier Patented Jan. 5, 1932

1,839,790

UNITED STATES PATENT OFFICE

HENRY KLOCKSIEM, OF PATON, IOWA

HARVESTER REEL END GUARD DEVICE

Application filed August 25, 1930. Serial No. 477,596.

The object of my invention is to provide a harvester reel end guard device which is simple, durable and comparatively inexpensive to manufacture.

More particularly it is my object to provide means for closing the end of a harvester reel so that various disadvantages of an open end reel are eliminated.

The invention applies to small grain harvesters, self binders, "combines" and the like. The open ends of harvester reels are continually picking up weeds and grain and the movable harvester platform, usually associated with a harvester reel, helps these weeds and grain due to its particular direction of travel to catch on the open ended reel and thus lessen the efficiency of the reel. Morning glories especially are troublesome. The grain which is tangled and twisted in the open end of the reel does not shock properly and is either lost in the field or rests on the ground under the shock so that it is not in good condition when it is time to thresh the grain. Especially when the wind is blowing, this tangled grain will be carried up by the open end of the reel and be wasted by the wind blowing it out of the path of the harvester. It is, therefore, necessary to clean out the reel whenever it becomes clogged which takes considerable time when any stops have to be made.

My present invention contemplates the provision of an end guard device for the reel which, besides preventing all tangling of the grain on the end of the reel, strengthens the reel. With such a device it is unnecessary to stop and clean out the end of the reel.

A further object of my invention is to provide an end guard device of novel construction consisting of a washer loosely fitted on the harvester reel shaft and guard spoke members of a peculiar formation secured to the washer and to the ends of the reel bars.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of a grain harvester looking at it from the rear end, showing my invention applied to the harvester reel.

Figure 2 is an enlarged perspective view of the connecting washer and one of the end guard spokes of my invention.

Figure 3 is an enlarged sectional view on the line 3—3 of Figure 1 showing how an end guard spoke is secured to a reel bar.

Figure 4 is a sectional view on the line 4—4 of Figure 2 showing the cross sectional shape of one of the end guard spokes midway between its ends and Figure 5 is an enlarged sectional view on the line 5—5 of Figure 2 showing the manner in which an end of a guard spoke is secured to the washer.

On the accompanying drawings, I have used the reference numeral 10 to indicate generally the platform frame of a harvester such as a grain binder. A supporting wheel is indicated at 12 and the sickle bar at 14. A traveling platform is indicated at 16, a reel shaft at 18, reel spokes at 20 and reel bars at 22. These parts are all standard construction of a small grain binder.

My end guard device for the reel consists of a washer 24 and end guard spokes 26. It will be noted that the reel spokes 20 are mounted substantially inward from the ends of the reel bars 22. This construction causes considerable trouble because of grain catching on the overhanging ends of the bars 22.

My end guard device is adapted to be applied to the reel in the following described manner.

The washer 24 is provided with an opening 28 which slips loosely over the reel shaft 18. Each guard spoke 26 (one being provided for each reel bar 22) has one end connected by a bolt 30 with the overhanging end of the reel bar 22, as shown in Figure 3. The other end of the spoke is connected by a bolt 32 extending through one of the openings 33 adjacent the periphery of the washer 24.

The outer edge of each guard spoke 26 is provided with a reversely directed flange 34 forming a rounded edge along the guard spoke for reinforcing the spoke and preventing catching of grain or weeds on the spoke itself. The flange 34 is rounded as indicated at 36 and bent out to a flat shape as indicated at 38 so as to bear flat against the washer 24 where the bolt 32 connects the washer and the guard spoke together.

A guard device of this character is easily applied to the harvester reel and involves a minimum of parts and operations for assembly. I have one in actual use and find that it is very effective for the purpose intended.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

What I claim is:

1. For use with a harvester reel having reel spokes spaced inwardly from the end thereof, an end guard device located at the end of the reel and comprising a washer to surround the reel shaft, guard spoke members each having one end secured to the washer and its other end secured to a reel bar, each guard spoke member being substantially U-shaped.

2. For use with a harvester reel having reel spokes spaced inwardly from the end thereof, an end guard device located at the end of the reel and comprising a washer to surround the reel shaft and guard spoke members each having one end secured to the washer and its other end secured to a reel bar.

3. For use with a harvester reel having reel spokes spaced inwardly from the end thereof, an end guard device comprising a washer on the reel shaft and radial guard spokes connected with the periphery of said washer and with the ends of the reel bars of said reel.

4. For use with a harvester reel having reel spokes spaced inwardly from the end thereof, an end guard device comprising a washer on the reel shaft and radial guard spokes extending therefrom, said spokes each having a U-shaped outer edge fitting around the ends of the reel bars, a portion of said edge adjacent said washer being flattened and fastening means thru said portion and thru said washer.

5. In combination with a harvester reel having reel spokes spaced inwardly from the end thereof, an end guard device comprising a washer having a central opening for a reel shaft and a plurality of openings adjacent its periphery and a plurality of guard spokes, each guard spoke having an opening at each end, one for fastening to a reel bar and fastening means thru the other one and thru one of said plurality of openings adjacent the periphery of said washer.

HENRY KLOCKSIEM.